US012654855B2

(12) United States Patent
Zhou

(10) Patent No.: US 12,654,855 B2
(45) Date of Patent: Jun. 16, 2026

(54) PARCEL TRANSPORT SYSTEM AND INSTALLING METHOD THEREOF

(71) Applicant: Pengyue Zhou, Shenzhen (CN)

(72) Inventor: Pengyue Zhou, Shenzhen (CN)

( * ) Notice: Subject to any disclaimer, the term of this patent is extended or adjusted under 35 U.S.C. 154(b) by 893 days.

(21) Appl. No.: 17/345,097

(22) Filed: Jun. 11, 2021

(65) Prior Publication Data

US 2021/0309363 A1 Oct. 7, 2021

Related U.S. Application Data

(63) Continuation of application No. PCT/CN2018/120553, filed on Dec. 12, 2018.

(51) Int. Cl.
*B64D 1/22* (2006.01)
*B64U 10/14* (2023.01)
*B64U 70/90* (2023.01)
*B65G 1/04* (2006.01)
*B64U 101/64* (2023.01)

(52) U.S. Cl.
CPC ............... *B64D 1/22* (2013.01); *B64U 10/14* (2023.01); *B64U 70/90* (2023.01); *B65G 1/04* (2013.01); *B64U 2101/64* (2023.01)

(58) Field of Classification Search
CPC .......... B64C 39/024; B64D 1/22; B65G 1/04; B65G 35/00; B65G 47/22; B65G 47/74; B64U 2101/60; B64U 10/14; B64U 70/90; B64F 1/32
See application file for complete search history.

(56) References Cited

U.S. PATENT DOCUMENTS

| | | | |
|---|---|---|---|
| 9,758,301 B2 | 9/2017 | Porat | |
| 9,975,651 B1 * | 5/2018 | Eck | B65G 67/04 |
| 10,147,067 B2 * | 12/2018 | Pleis | A47G 29/1225 |
| 10,351,261 B1 * | 7/2019 | Bryant | G07F 9/002 |
| 10,501,205 B1 * | 12/2019 | Siewert | B64D 1/02 |
| 10,647,508 B2 * | 5/2020 | Eck | B65G 1/0464 |
| 10,689,111 B2 * | 6/2020 | von Gostomski | B64C 39/024 |
| 2008/0152466 A1 | 6/2008 | Bonora et al. | |
| 2015/0317596 A1 | 11/2015 | Hejazi | |
| 2017/0175413 A1 | 6/2017 | Curlander et al. | |
| 2019/0300202 A1 * | 10/2019 | High | G06Q 10/08 |
| 2020/0178717 A1 * | 6/2020 | Gil | B64U 10/14 |

(Continued)

FOREIGN PATENT DOCUMENTS

| | | |
|---|---|---|
| CN | 104627552 A | 5/2015 |
| CN | 205563689 U | 9/2016 |

(Continued)

*Primary Examiner* — Patrick H Mackey

(57) ABSTRACT

A goods transport system is provided, which comprises an interface assembly, a storage assembly and a transport assembly. A storage box of the storage assembly is provided with a first access opening and a second access opening, the storage box is movable to enable the first access opening to be exposed and to be blocked; the interface assembly is used for a goods transfer to or from an external equipment; and wherein the transport assembly is capable of reaching into the storage box via the second access opening, and engaging in the goods transfer to/from the external equipment or the interface assembly at the interface assembly, enabling the transport assembly to deliver the goods between the interface assembly and the storage box.

20 Claims, 11 Drawing Sheets

(56)                     References Cited

U.S. PATENT DOCUMENTS

2021/0284450 A1 *   9/2021  Wang ................... B65G 1/0435
2021/0321810 A1 * 10/2021  Sun ..................... G07F 11/1653

FOREIGN PATENT DOCUMENTS

| CN | 205739044  | U  | 11/2016 |
| CN | 206345247  | U  | 7/2017  |
| CN | 207390180  | U  | 5/2018  |
| CN | 108163678  | A  | 6/2018  |
| CN | 108249115  | A  | 7/2018  |
| CN | 113365928  | A  | 9/2021  |
| DE | 102014112480 | A1 | 3/2016  |
| EP | 3321179    | A1 | 5/2018  |
| JP | 2018095462 | A  | 6/2018  |
| WO | 2014080390 | A2 | 5/2014  |

* cited by examiner

PARCEL TRANSPORT SYSTEM AND INSTALLING METHOD THEREOF

CROSS REFERENCE TO RELATED APPLICATIONS

The present disclosure is a continuation application of the international application No. PCT/CN2018/120553 filed Dec. 12, 2018, the entire content of which is hereby incorporated by reference.

TECHNICAL FIELD

The present disclosure relates to a goods transport system and an installing method thereof.

BACKGROUND

With the rapid development of drone technology, unmanned aerial vehicles and unmanned ground vehicles (self-driving vehicles) have been applied to goods delivery in an express delivery industry. However, compared with delivery implemented by a human, intelligent equipment such as the unmanned aerial vehicles and the unmanned ground vehicles are difficult to implement home delivery, thus it is still inconvenient for users to receive and send the goods, especially for users who stay in multi-storey buildings.

SUMMARY

As such, the present disclosure proposes a goods transport system which makes the goods delivery more convenient and is capable of being applied to a multi-storey building.

The goods transport system comprises an interface assembly, a storage assembly and a transport assembly. The interface assembly is used for goods transfer to or from an external equipment. The storage assembly comprises a storage box used for accommodating the goods, wherein the storage box is provided with a first access opening and a second access opening, and the storage box is movable to enable the first access opening to be exposed and to be blocked. The transport assembly is capable of transporting the goods, wherein the transport assembly is capable of reaching into the storage box via the second access opening, enabling the transport assembly to move the goods into or out of the storage box; and wherein the transport assembly is capable of engaging in the goods transfer to/from the external equipment or the interface assembly at the interface assembly, enabling the transport assembly to deliver the goods between the interface assembly and the storage box.

In addition, the present disclosure also proposes a method for installing the goods transport system, which comprises: providing the goods transport system: installing the interface assembly on a building: installing the storage assembly adjacent to a communicating portion of the building, which communicates with outside of the building, and arranging the first access opening of the storage box arranged towards the building, so that the storage box is capable of moving until the storage box is opposite to the communicating portion and the first access opening is exposed; and installing the transport assembly on the building.

BRIEF DESCRIPTION OF DRAWINGS

To better explain the embodiments of the present disclosure or the technical solutions of the prior art, the following will briefly introduce the drawings involved in the description of the embodiments or the prior art. It is obvious that the drawings in the following description are only some embodiments of the invention. For persons skilled in the art, the drawings of other embodiments can be obtained from these drawings without paying creative work.

DETAILED DESCRIPTION OF THE EMBODIMENTS

In order to help understanding of the present disclosure, the present disclosure will be described more comprehensively hereinafter with reference to the relevant accompanying drawings.

Figure 1:
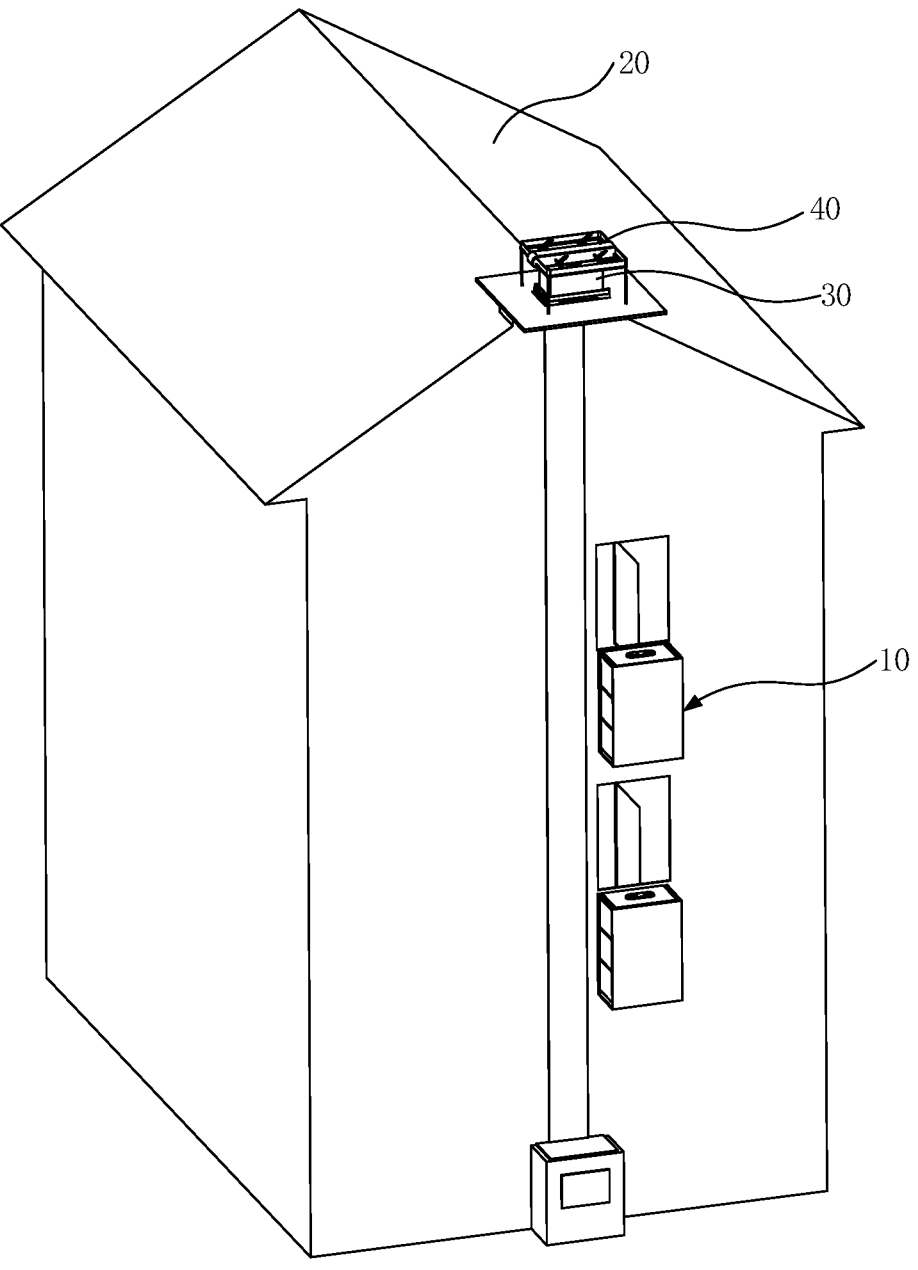
FIG. 1 is a schematic structural diagram of a goods transport system installed on a building, when an unmanned aerial vehicle lands on the goods transport system, according to one implementation.
Figure 2:
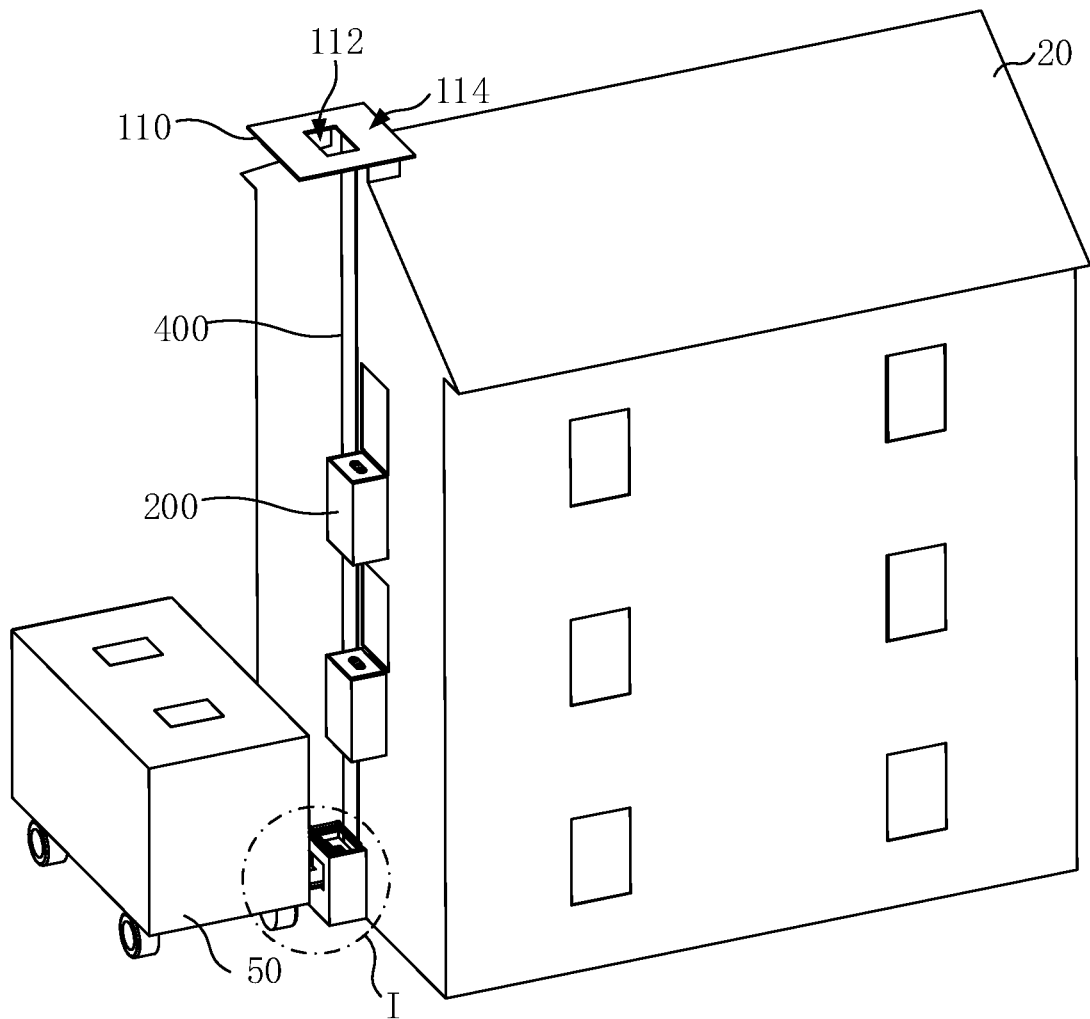
FIG. 2 is a schematic structural diagram of the goods transport system shown in FIG. 1, when the goods transport system interfaces with a ground equipment.

As shown in FIG. 1 and FIG. 2, a goods transport system 10 according to an implementation is configured to be installed on a building 20, which is particularly suitable to be installed on a multi-storey building for storage and delivery of goods 30. The goods transport system 10 is capable of implementing the goods 30 delivery between an external equipment and a user staying in the building 20. Moreover, the goods transport system 10 is capable of implementing the goods 30 delivery among an unmanned aerial vehicle 40, the user staying in the building 20 and a ground equipment 50, that is, the goods transport system 10 is used as follows: the unmanned aerial vehicle 40 offloads the goods 30 onto the goods transport system 10, the user takes the goods 30 while staying in the building 20 or the ground equipment 50 takes the goods 30 away: alternatively, the user places the goods 30 onto the goods transport system 10 while staying in the building 20, the unmanned aerial vehicle 40 takes the goods 30 away or the ground equipment 50 takes the goods 30 away: alternatively, the ground equipment 50 transfers the goods 30 to the goods transport system 10, the unmanned aerial vehicle 40 takes the goods 30 away or the user takes the goods 30 while staying in the building 20.

The goods transport system 10 comprises an interface assembly, a storage assembly 200 and a transport assembly 400.

Figure 3:
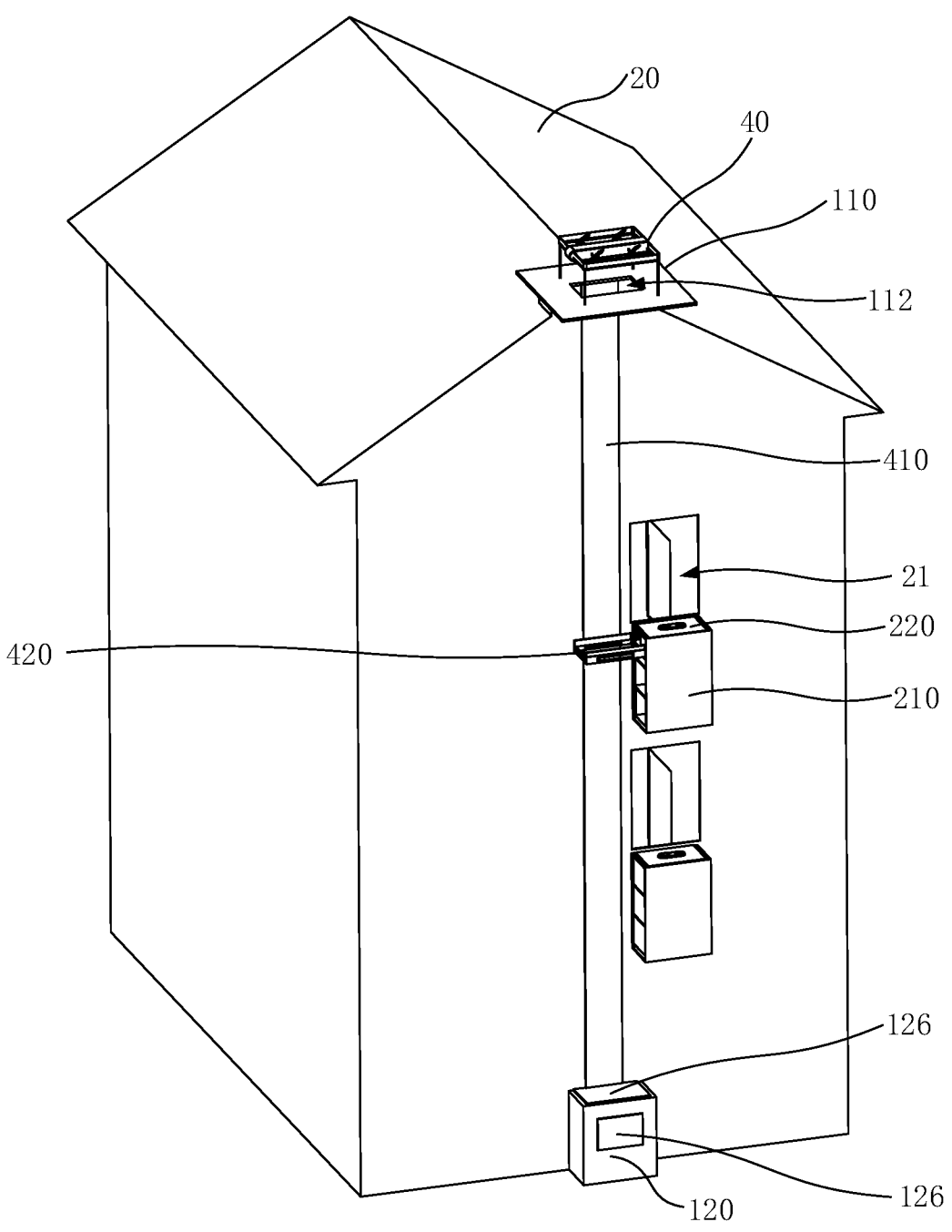
FIG. 3 is a schematic structural diagram of the goods transport system shown in FIG. 1, when a carrying mechanism of a transport assembly and a storage assembly in the goods transport system are in goods transfer state.

Referring to FIG. 3, the interface assembly is used for a transfer of the goods 30 to/from the external equipment. The external equipment may be the unmanned aerial vehicle 40, the ground equipment 50, etc. Wherein the ground equipment may be an unmanned ground vehicle and/or the like. Specifically, in the illustrated embodiment, the interface assembly comprises a landing platform 110 and an interface facility 120.

The landing platform 110 is used for landing of the unmanned aerial vehicle 40. A transfer opening 112 for the goods 30 to pass through is formed in the landing platform 110. In the illustrated embodiment, the landing platform 110 is installed on top portion of the building 20, for example, installed on a roof. The landing platform 110 is substantially a plate-like structure, the transfer opening 112 is disposed in central portion of the landing platform 110, and the landing platform 110 is horizontally arranged.

It should be understood that the landing platform 110 is not limited to the above-mentioned structure. The landing platform 110 is provided with a working surface 114 for the unmanned aerial vehicle 40 to land on, the working surface 114 is horizontally arranged, and the transfer opening 112 is disposed in central portion of the working surface 114, thus the landing platform 110 may take any of a variety of structures.

The interface facility 120 is capable of engaging in the goods 30 transfer to/from the ground equipment 50. Specifically, the interface facility 120 is below (directly below or not directly below) the landing platform 110. In the illustrated embodiment, the interface facility 120 is installed on bottom portion of the building 20.

Figure 4:
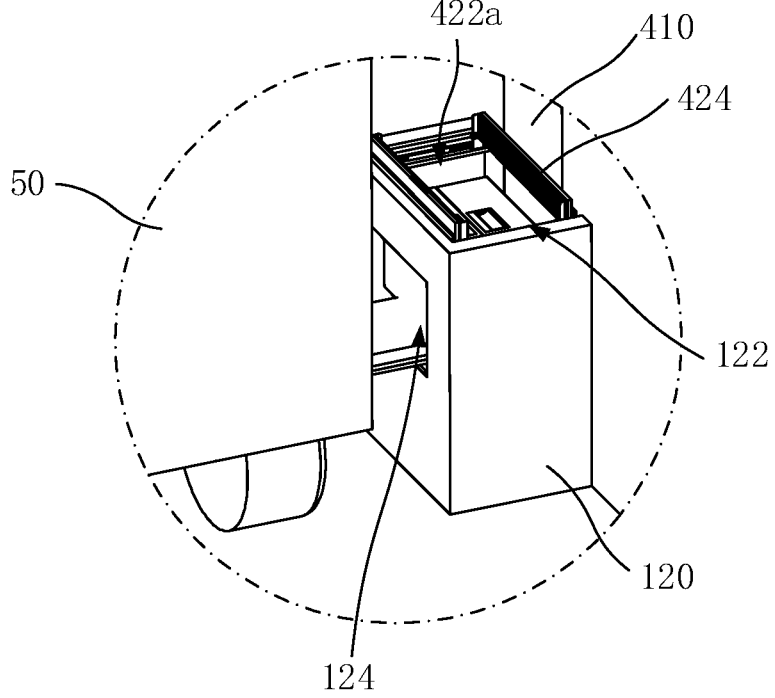
FIG. 4 is an enlarged view of a part I in FIG. 2.

Referring to FIG. 4, a transport opening 122 and an interface opening 124 are formed in the interface facility 120. The interface opening 124 is capable of interfacing with the ground equipment 50, in order for the goods 30 transfer between the interface facility 120 and the ground equipment 50. The transport opening 122 is used for interfacing with the transport assembly 400 in order for the goods 30 transfer. The transport opening 122 and the interface opening 124 are each arranged with a door 126 respectively.

It should be noted that in order to ease the goods 30 transfer between the interface facility 120 and the ground equipment 50, a transfer member (not shown in the figure) used for transferring the goods may be arranged in the interface facility 120, the transfer member is capable of moving out via the interface opening 124 to receive the goods 30 from the ground equipment 50, or to transfer the goods 30 to the ground equipment 50. Alternatively, the interface facility 120 may be provided without the transfer member, in this case, the ground equipment 50 is provided with a transfer member. It should be understood that the interface facility 120 is not limited to the above-mentioned structure, in other embodiments, the interface facility 120 may be a platform on which the goods 30 may be placed.

The storage assembly 200 is capable of being mounted on an exterior wall of the building 20. Specifically, the storage assembly 200 is arranged adjacent to a communicating portion 21 of the building 20, wherein the communicating portion 21 of the building 20 communicates with outside of the building, and may be a window or a balcony. In the illustrated embodiment, the storage assembly 200 is arranged adjacent to the window, and the storage assembly 200 is also positioned between the landing platform 110 and the interface facility 120. In other embodiments, the storage assembly 200 may be arranged in the vicinity of a balcony railing. A plurality of storage assemblies 200 are provided, and the plurality of storage assemblies 200 are respectively arranged adjacent to a plurality of communicating portions 21 of the building 20. The number of the storage assemblies 200 may be configured according to the number of the communicating portions 21 which the building 20 has, and may be configured as needed.

Figure 5:
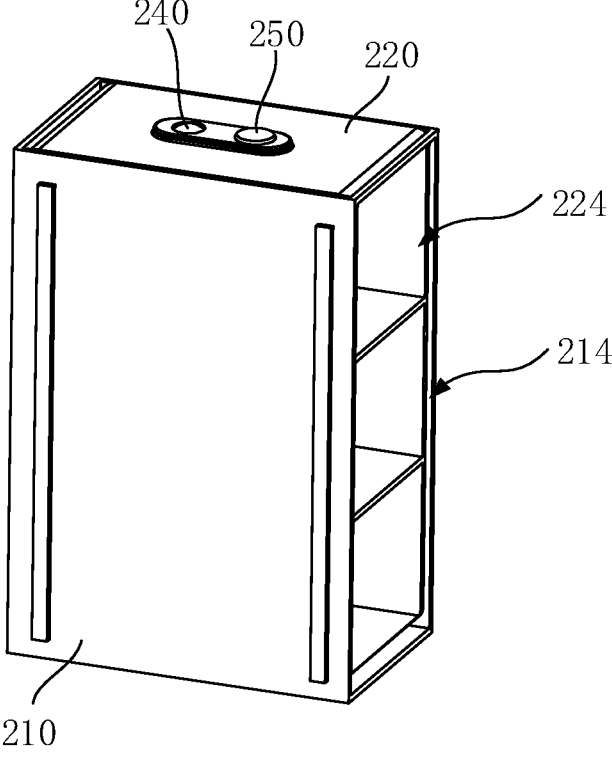
FIG. 5 is a schematic structural diagram of the storage assembly in the goods transport system shown in FIG. 1 from another angle, wherein a shielding door is omitted.

Referring to FIG. 5, in the illustrated embodiment, each storage assembly 200 comprises an outer box body 210 and a storage box 220.

Figure 6:
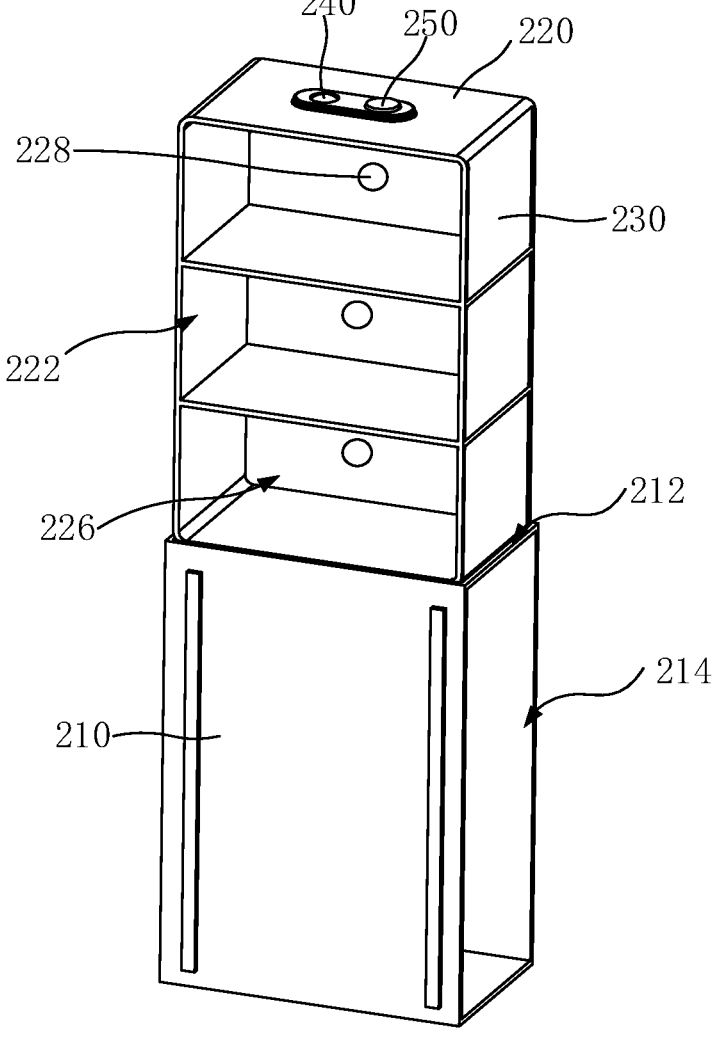
FIG. 6 is a schematic structural diagram of the storage assembly shown in FIG. 5 when the storage assembly is in another state.

Referring to FIG. 6, the outer box body 210 is capable of being mounted on the exterior wall of the building 20. The outer box body 210 is installed below the communicating portion 21 of the building 20. A first opening 212 and a second opening 214 are formed in the outer box body 210. In one embodiment, the outer box body 210 is substantially cuboid-shaped, the first opening 212 and the second opening 214 are respectively arranged in two adjacent faces of the outer box body 210. In the illustrated embodiment, the outer box body 210 is provided with a bottom wall opposite to the first opening 212, the bottom wall is configured to face downwards, while the first opening 212 is configured to face upwards.

It should be understood that the outer box body 210 is not limited to the above-mentioned structure, and structure of the outer box body 210 may be configured as needed.

Figure 7:
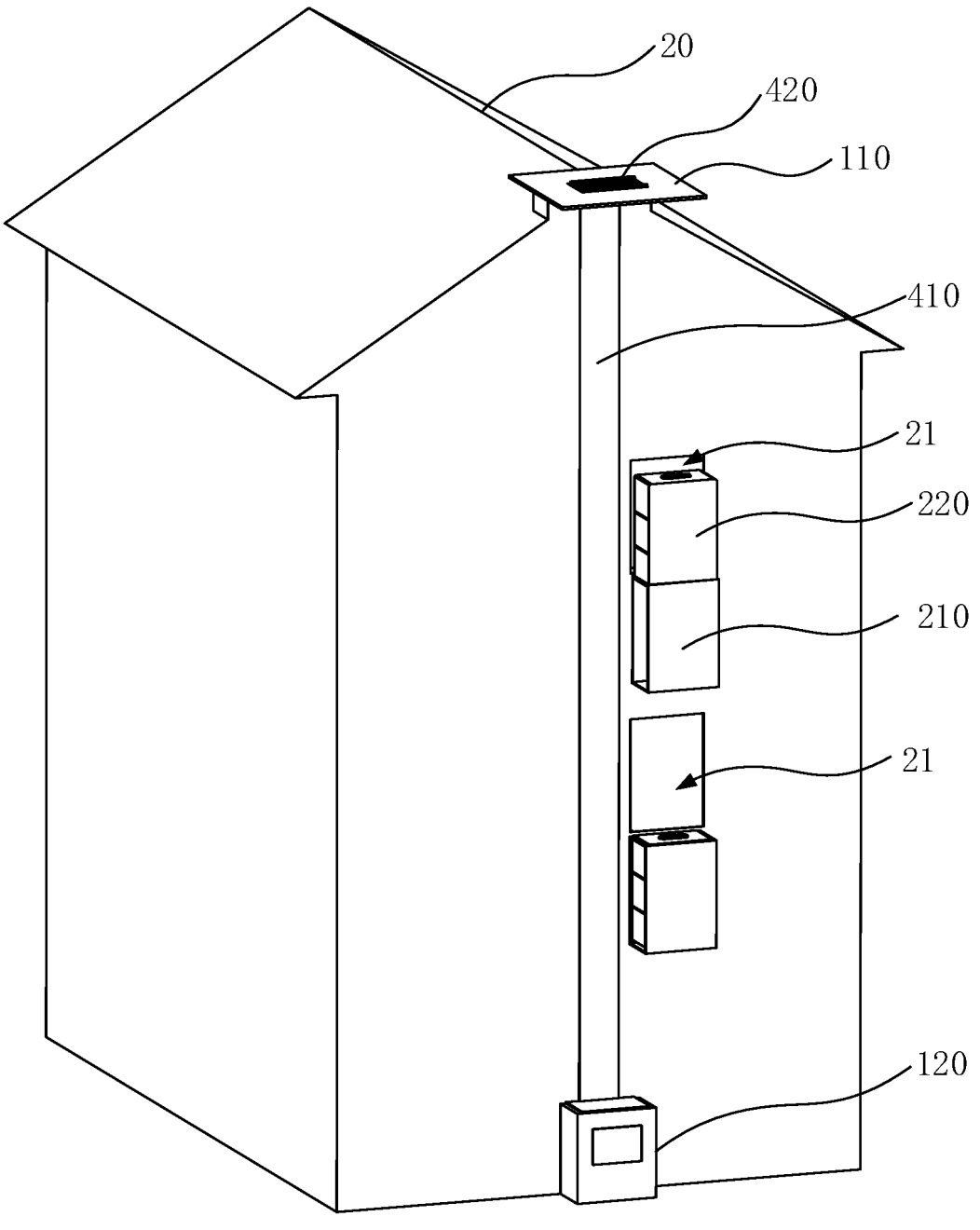
FIG. 7 is a schematic structural diagram of the goods transport system shown in FIG. 1, when one of the storage assemblies is in another state.

The storage box 220 is used for accommodating the goods 30, wherein the storage box 220 is provided with a first access opening 222 and a second access opening 224. The storage box 220 is movable to enable the first access opening 222 to be exposed and to be blocked. The first access opening 222 is used for the user to take and to put the goods 30, and the second access opening 224 is used for a transfer of the goods 30 between the storage box 220 and the transport assembly 400. Specifically, the storage box 220 is capable of being accommodated in the outer box body 210, enabling the outer box body 210 to block the first access opening 222, thereby preventing the user from putting the goods 30 into the storage box 220 and from taking the goods 30 out of the storage box 220 via the first access opening 222. The storage box 220 is also capable of moving out via the first opening 212, enabling the first access opening 222 to be exposed, thereby enabling the user to put the goods 30 into the storage box 220 and to take the goods 30 out of the storage box 220. When the storage box 220 is accommodated in the outer box body 210, a position of the second access opening 224 is configured to correspond to a position of the second opening 214. Referring to FIG. 7, in the illustrated embodiment, the storage box 220 is capable of moving up and down relative to the outer box body 210, and the first access opening 222 is arranged towards the building 20. When the first access opening 222 is exposed, the first access opening 222 is opposite the communicating portion 21 of the building 20, facilitating the user to take the goods 30 out of the storage box 220 or to put the goods 30 into the storage box 220.

In the illustrated embodiment, the storage box 220 is provided with a plurality of compartments 226, each compartment 226 is provided with the first access opening 222 and the second access opening 224, positions of a plurality of second access openings 224 are all configured to correspond to a position of the second opening 214, and the storage box 220 is capable of moving out via the first opening 212 to make the first access opening 222 of at least part of the compartments 226 exposed, the user may adjust the number of the first access openings 222 which are exposed according to the number of compartments 226 which the user needs. It should be understood that the number of the compartments 226 in the storage box 220 may be one, or the number of the compartments 226 in the storage box 220 may be configured as needed, it is more convenient to store a plurality of goods 30 at once with the plurality of compartments 226.

Further, each compartment 226 is provided with a sensor 228 that is configured to detect the presence of the goods 30 in the respective compartment 226. The sensor 228 is a nfc reader or a camera, correspondingly, the goods 30 are provided with a nfc label or a QR code label respectively. Furthermore, a weight sensor (not shown in the figure) is provided at bottom of the storage box 220 and is configured to weigh the goods 30 in the storage box 220. After each time the user places the goods 30, a weight gain is measured by the weight sensor, in order to get a weight of the goods 30.

It should be noted that, when the storage box 220 is provided with the plurality of compartments 226, in order to ensure security of the goods 30 stored in the storage box 220, each first access opening 222 may be arranged with an automatic door to prevent the user from taking the goods 30 which belongs to other user.

In the illustrated embodiment, the storage assembly 200 further comprises a shielding door 230 capable of covering the second access opening 224. The number of the shielding door 230 is consistent with the number of the second access opening 224. It should be understood that in other embodiments, the number of the shielding door 230 may be one, and one shielding door 230 is capable of covering the plurality of second access openings 224.

The storage assembly 200 further comprises a range sensor 240 arranged on the storage box 220, the range sensor 240 is capable of detecting an obstacle in order for movement control of the storage box 220, so as to prevent the storage box 220 from colliding with an obstacle (e.g. an opened casement) in a direction of movement.

The storage assembly 200 further comprises an alarm 250 arranged on the storage box 220, the alarm is capable of giving an alarm while the storage box 220 is moving, so as to warn the user. Specifically, the alarm 250 is an alarm lamp, a sound alerter, and/or the like.

The transport assembly 400 is capable of transporting the goods 30. The transport assembly 400 is capable of reaching into the storage box 220 via the second access opening 224, enabling the transport assembly 400 to move the goods 30 into the storage box 220 and to move the goods 30 out of the storage box 220. The transport assembly 400 is capable of engaging in the goods 30 transfer to/from the external equipment or the interface assembly at the interface assembly, so that the transport assembly 400 is capable of delivering the goods 30 between the interface assembly and the storage box 220. Moreover, the transport assembly 400 is capable of engaging in the goods 30 transfer to/from the unmanned aerial vehicle 40 at the landing platform 110, and the transport assembly 400 is also capable of engaging in the goods 30 transfer to/from the interface facility 120, enabling the transport assembly 400 to deliver the goods 30 among the landing platform 110, the storage box 220 and the interface facility 120. Specifically, when the storage box 220 is accommodated in the outer box body 210, the transport assembly 400 is capable of reaching into the storage box 220 via the second access opening 224 and the second opening 214: The shielding door 230 which covers the second access opening 224 is capable of being opened automatically when the goods 30 are transferred between the transport assembly 400 and the storage box 220, and the shielding door 230 is in a closed state when there is no goods 30 transfer.

In the illustrated embodiment, the transport assembly 400 comprises a sliding rail 410 and a carrying mechanism 420 capable of sliding along the sliding rail 410 and carrying the goods 30.

One end of the sliding rail 410 extends to the transfer opening 112, and the other end of the sliding rail 410 extends to the interface facility 120. Specifically, one end of the sliding rail 410 is far away from the transfer opening 112, and extends to the transport opening 122 of the interface facility 120. In the illustrated embodiment, the sliding rail 410 extends in vertical direction. The storage box 220 is arranged proximate the sliding rail 410. Specifically, the second access opening 224 is arranged towards the sliding rail 410.

The carrying mechanism 420 is capable of being positioned at the transfer opening 112 to engage in the goods 30 transfer to/from the unmanned aerial vehicle 40, and the carrying mechanism 420 is capable of being positioned at the interface facility 120 to engage in the goods 30 transfer to/from the interface facility 120, and the carrying mechanism 420 is also capable of reaching into the storage box 220 via the second access opening 224, enabling the carrying mechanism 420 to deliver the goods 30 among the transfer opening 112, the storage box 220 and the interface facility 120. Specifically, the carrying mechanism 420 is capable of being positioned at the transport opening 122, in order to engage in the goods 30 transfer to/from the interface facility 120 via the transport opening 122.

Figure 8:
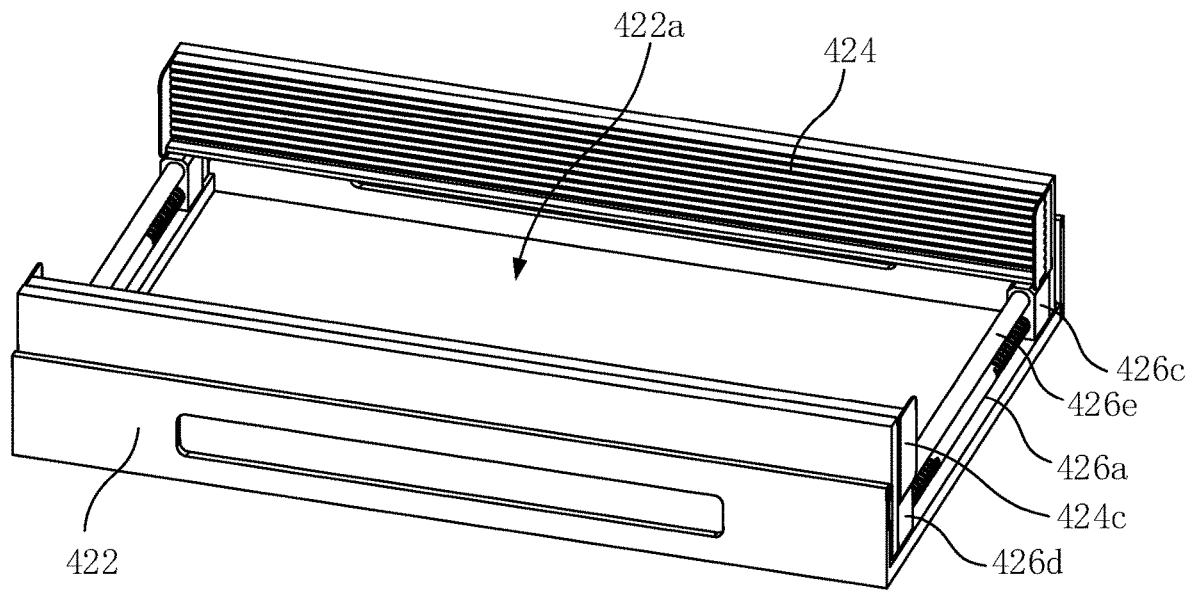
FIG. 8 is a schematic structural diagram of the carrying mechanism of the transport assembly in the goods transport system shown in FIG. 7.
Figure 9:
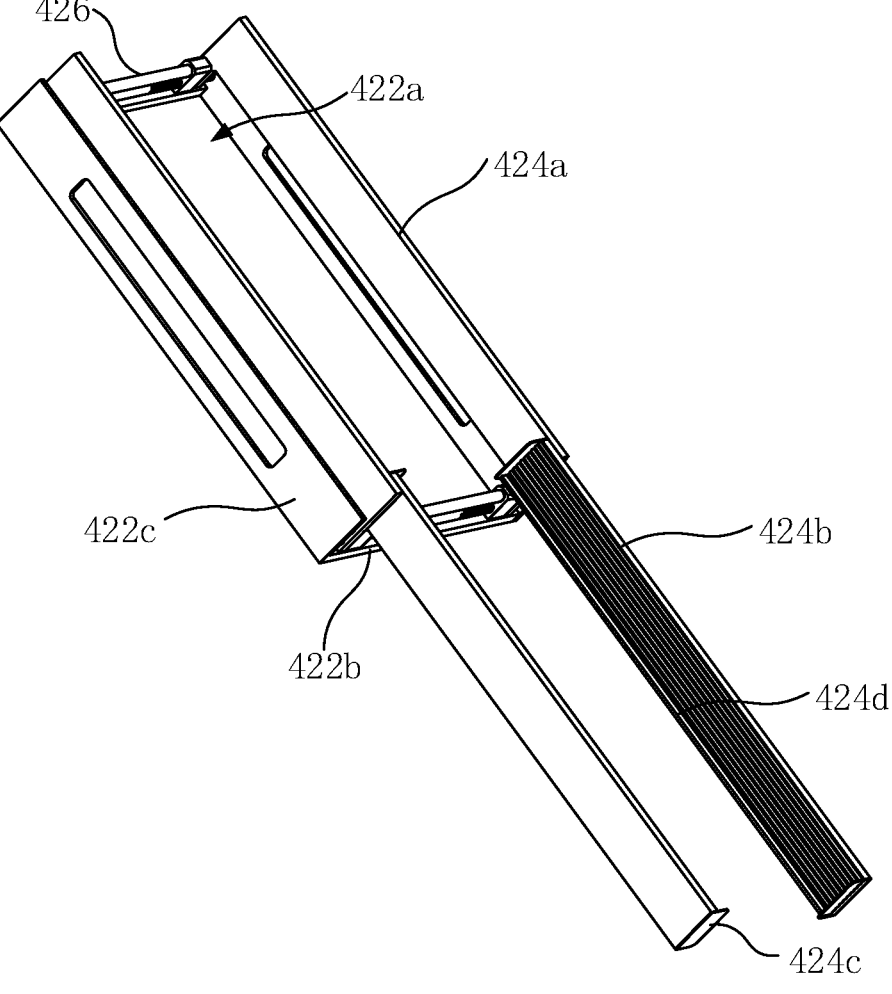
FIG. 9 is a schematic structural diagram of the carrying mechanism shown in FIG. 8, when the carrying mechanism is in another state.

Referring to FIG. 8 and FIG. 9, in the illustrated embodiment, the carrying mechanism 420 comprises a sliding carriage 422, clamping arms 424 and a transmission device 426.

The sliding carriage 422 is capable of sliding along the sliding rail 410. A through hole 422*a* for the goods 30 to pass through is formed in the sliding carriage 422. In one embodiment, the sliding carriage 422 is roughly a U-shaped structure, and the sliding carriage 422 includes a bottom plate 422*b* and two opposite supporting plates 422*c* fixedly connected with the bottom plate 422*b*. The bottom plate 422*b* is perpendicular to the direction in which the sliding rail 410 extends, and the two supporting plates 422*c* extend in vertical direction away from the bottom plate 422*b*. The through hole 422*a* is formed in the bottom plate 422*b*. Specifically, an exterior side of one of the supporting plates 422*c* is slidably connected with the sliding rail 410.

Figure 10:
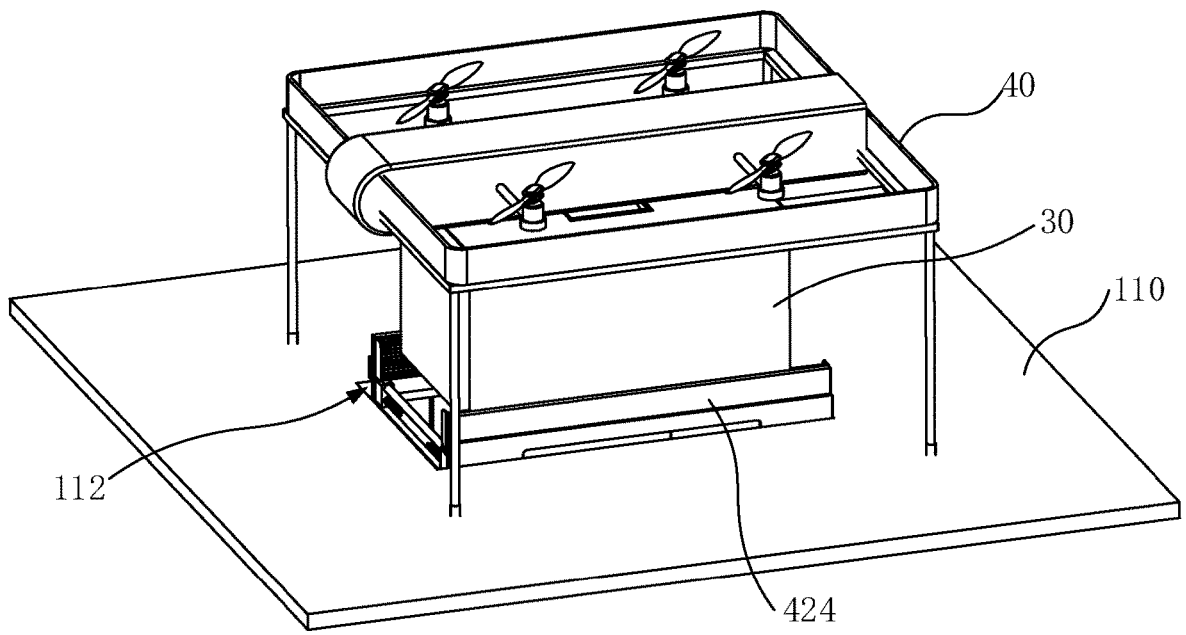
FIG. 10 is a schematic structural diagram showing that the carrying mechanism of the transport assembly in the goods transport system shown in FIG. 1 engages in goods transfer to/from the unmanned aerial vehicle landing on a landing platform.

The two clamping arms 424 are both installed on the sliding carriage 422, so that the two clamping arms 424 are capable of sliding along the sliding rail 410 with the sliding carriage 422. The two clamping arms 424 are oppositely arranged. At least one of the two clamping arms 424 is capable of sliding in a first direction, so that a distance between the two clamping arms 424 is adjustable, enabling the two clamping arms 424 to clamp the goods 30 and to release the goods 30. The two clamping arms 424 are also extendable in a second direction perpendicular to the first direction, and the two clamping arms 424 are capable of reaching into the storage box 220 via the second access opening 224, enabling the two clamping arms 424 to move the goods 30 into the storage box 220 and to move the goods 30 out of the storage box 220. The two clamping arms 424 are capable of passing through the transfer opening 112 when being in a retracted state, in order for the goods 30 transfer to/from the unmanned aerial vehicle 40, as shown in FIG. 10.

In the illustrated embodiment, the first direction and the second direction are both perpendicular to the direction in which the sliding rail 410 extends.

A clamped space is formed between the two clamping arms 424. When the two clamping arms 424 are in the retracted state, the clamped space is configured to corre-spond to a position of the through hole 422a. As shown in FIG. 4, when the carrying mechanism 420 is positioned at the transport opening 122 of the interface facility 120, the through hole 422a is opposite the transport opening 122, enabling the goods 30 to pass through the through hole 422a and the transport opening 122, thus enabling the goods 30 transfer between the two clamping arms 424 and the inter-face facility 120.

Specifically, each clamping arm 424 comprises a mount-ing plate 424a and a clamping plate 424b mounted on the mounting plate 424a. The mounting plates 424a of the two clamping arms 424 are oppositely arranged, and at least one of the mounting plates 424a of the two clamping arms 424 is capable of sliding in the first direction, so that a distance between the clamping plates 404b of the two clamping arms 424 is adjustable to enable the clamping plates 404b to clamp the goods 30 and to release the goods 30. The clamping plates 424b are capable of sliding in the second direction, enabling the clamping plates 424b to reach into the storage box 220 via the second access opening 224, in order to move the goods 30 into or out of the storage box 220. In the illustrated embodiment, the mounting plates 424a of the two clamping arms 424 are both parallel to the two supporting plates 422c of the sliding carriage 422, the clamping plate 424b is disposed on one side of the mounting plate 424a of the clamping arm 424 close to the other clamping arm 424.

Moreover, each clamping arm 424 further comprises a positioning piece 424c, the positioning piece 424c is fixed on one side of the clamping plate 424b of the clamping arm 424 close to the other clamping arm 424, and is disposed at end portion of the clamping plate 424b in the second direction. The positioning pieces 424c are capable of being driven by sliding of the clamping plates 424b in the second direction, to push the goods 30 located in the storage box 220, so as to adjust a position of the goods 30, thus realizing that the goods 30 are placed properly relative to the clamp-ing plates 424b in the second direction when the clamping plates 424b clamp the goods 30. Specifically, each clamping plate 424b is provided with two positioning pieces 424c, and the two positioning pieces 424c are respectively disposed at two ends of each clamping plate 424b in the second direc-tion, in this case, the storage assemblies 200 may be installed at both sides of the sliding rail 410. It should be understood that in other embodiments, each clamping plate 424b is provided with one positioning piece 424c, and the position-ing piece 424c of each clamping plate 424b is disposed at single end of the respective clamping plate 424b in the second direction, in this case, it is suitable to install the storage assembly 200 at single side of the sliding rail 410, and the positioning pieces 424c of the two clamping plates 424b are both arranged close to the storage assembly 200.

Further, a supporting portion 424d which extends perpen-dicularly from one side of the clamping plate 424b is provided, the supporting portion 424d is disposed on one side of the clamping plate 424b of the clamping arm 424 close to the other clamping arm 424, and the supporting portions 424d of the two clamping arms 424 are capable of jointly supporting the goods 30. Specifically, the supporting portion 424d extends in the second direction from one end to the other end of the clamping plate 424b. With the supporting portions 424d arranged, the carrying mechanism 420 is capable of carrying the goods 30 not only by clamping the goods 30, the carrying mechanism 420 may also carry the goods 30 by supporting the goods 30 via the supporting portions 424d.

Figure 11:
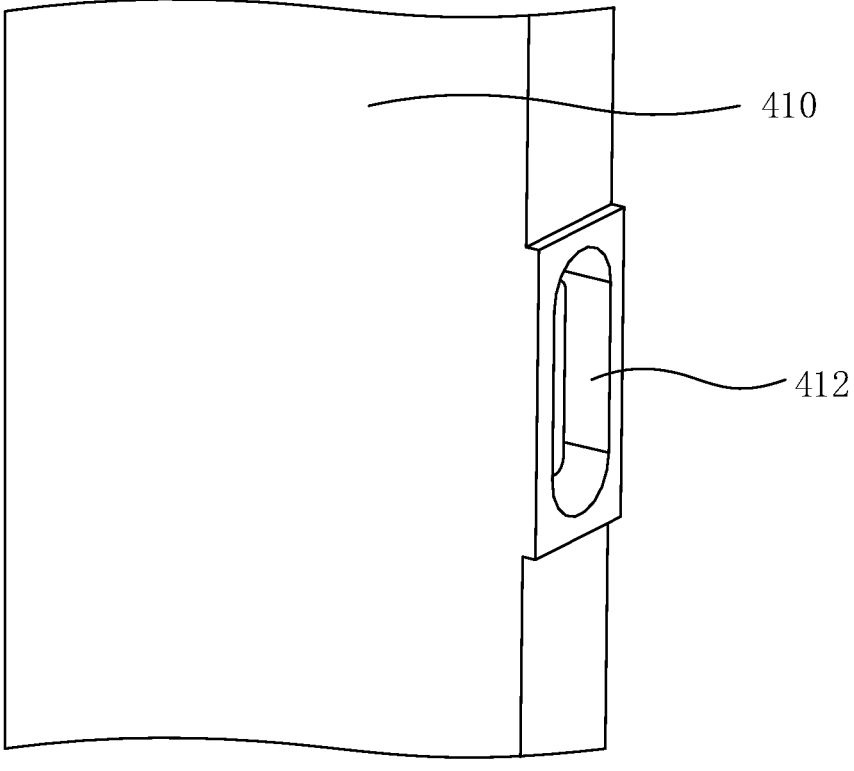
FIG. 11 is a local schematic diagram of a sliding rail of the transport assembly in the goods transport system shown in FIG. 3.

Referring to FIG. 11, specifically, the sliding rail 410 is provided with an electrical interface 412 capable of being electrically connected to the storage assembly 200 with a cable, so that the sliding rail 410 is capable of supplying electricity to the storage assembly 200 and transmitting data to/from the storage assembly 200.

The transmission device 426 is arranged on the sliding carriage 422, and the transmission device 426 is capable of driving at least one of the two clamping arms 424 to slide in the first direction. In the illustrated embodiment, the trans-mission device 426 is capable of driving the two clamping arms 424 to slide in the opposite directions both parallel to the first direction. Specifically, the transmission device 426 comprises a lead screw 426a, a motor (not shown in the figure), a first slider 426c and a second slider 426d.

The lead screw 426a is capable of being rotatably arranged on the sliding carriage 422, and the lead screw 426a extends in the first direction. Specifically, the lead screw 426a is provided with both left-hand threads and right-hand threads. Two ends of the lead screw 426a rotat-ably cross the two supporting plates 422c respectively.

The motor and the lead screw 426a are connected in a transmission way, and the motor is used to drive the lead screw 426a to rotate.

The first slider 426c and the second slider 426d are both sleeved on the lead screw 426a, and are mated with the threads of the lead screw 426a. The first slider 426c and the second slider 426d slide in the opposite directions, wherein one clamping arm 424 is fixedly connected with the first slider 426c and the other clamping arm 424 is fixedly connected with the second slider 426d, so that one clamping arm 424 can slide with the first slider 426c and the other clamping arm 424 can slide with the second slider 426d, so as to make the distance between the two clamping arms 424 adjustable. In the illustrated embodiment, the mounting plate 424a of one clamping arm 424 is fixedly connected with the first slider 426c, and the mounting plate 424a of the other clamping arm 424 is fixedly connected with the second slider 426d.

The transmission device 426 further comprises a guiding rod 426e fixed on the sliding carriage 422, the guiding rod 426e and the lead screw 426a extend in parallel direction, the first slider 426c and the second slider 426d are both sleeved on the guiding rod 426e and are both slidable relative to the guiding rod 426e. Specifically, two ends of the guiding rod 426e are fixedly connected with the two sup-porting plates 422c respectively.

In the illustrated embodiment, two transmission devices 426 are provided, and are arranged proximate two ends of the bottom plate 422b in the second direction respectively, so as to avoid obstructing the goods 30 from passing through the through hole 422a. The lead screws 426a of the two transmission devices 426 are spaced and parallel, the mount-ing plate 424a of one clamping arm 424 is fixedly connected with the first sliders 426c of both two transmission devices 426, and the mounting plate 424a of the other clamping arm 424 is fixedly connected with the second sliders 426d of both two transmission devices 426.

Further, a protective structure (not shown in the figure) is provided at one side of the sliding rail. The protective structure extends from one end of the sliding rail 410 to the other end of the sliding rail 410, and communicates with the transfer opening 112, the transport opening 122 and the second opening 214. When the two clamping arms 424 are in the retracted state, the carrying mechanism 420 is accommodated in the protective structure, so as to protect the carrying mechanism 420 and the carried goods 30 from external environment influence.

It should be noted that a control unit is provided to realize intelligent control of the storage assembly 200, the interface facility 120 and the transport assembly 400.

The storage assembly 200 may be provided without including the outer box body 210, in this case, the first access opening 222 is configured to face the building 20 and to be blocked by the building 20, the transport assembly 400 is capable of reaching into the storage box 220 via the second access opening 224 to move the goods 30 into or out of the storage box 220. The storage box 220 is capable of moving until the first access opening 222 is opposite the communicating portion 21 of the building 20, to make the first access opening 222 exposed.

It should be understood that the two clamping arms 424 are not limited to being both slidable in the first direction. In other embodiments, one clamping arm 424 is able to slide in the first direction, and the other clamping arm 424 is unable to slide in the first direction, in this case, the transmission device 426 only needs one slider, and the slider is fixedly connected with the clamping arm 424 which is slidable.

It should be understood that the transmission device 426 is not limited to the above-mentioned structure. For example, the transmission device 426 is a telescopic rod, two ends of the telescopic rod are fixedly connected with the clamping plates 424B of the two clamping arms 424 respectively, the distance between the two clamping arms 424 is adjustable by extension or contraction of the transmission device 426; alternatively, the sliding carriage 422 may be omitted, in other embodiments, one of the two clamping arms 424 is arranged on the sliding rail 410, and the other is capable of sliding in the first direction, the transmission device 426 is a telescopic rod, and two ends of the telescopic rod are fixedly connected with the clamping plates 424B of the two clamping arms 424 respectively, the distance between the two clamping arms 424 is adjustable by extension or contraction of the transmission device 426.

The goods transport system 10 owns at least advantages listed below.

The goods transport system 10 comprises the interface assembly, the storage assembly 200 and the transport assembly 400, the storage assembly 200 comprises the storage box 220 used for accommodating the goods 30, and the interface assembly is used for the goods 30 transfer to/from an external equipment, the transport assembly 400 is capable of reaching into the storage box 220 via the second access opening 224 to move the goods 30 into or out of the storage box 220, the transport assembly 400 is also capable of engaging in the goods 30 transfer to/from the external equipment or the interface assembly at the interface assembly, enabling the transport assembly 400 to deliver the goods 30 between the interface assembly and the storage box 220, thereby realizing and facilitating the goods 30 delivery between the external equipment and the user. When the goods transport system 10 is applied to the multi-storey building, the interface assembly is configured depending on the external equipment which the interface assembly needs to interface with, in order to ease the goods 30 transfer to/from the external equipment: the storage assembly 200 is arranged adjacent to the window of the building 20 or is installed on exterior side of the balcony railing, facilitating the user to access the goods 30: the storage box 220 is movable, and makes the first access opening 222 exposed or blocked by movement of the storage box 220, so as to avoid obstructing a view from the window or from the balcony when the storage box 220 is not utilized. Thus, the goods transport system 10 realizes and facilitates the goods 30 delivery between the user staying in the multi-storey building and the external equipment without a need for the user to go downstairs, and is particularly suitable for use in the goods 30 delivery of the multi-storey building.

In addition, the whole or most of components in the goods transport system 10 may be installed on exterior of the building 20, dispensing with a lot of work to retrofit interior structure of the existing building 20, thereby lowering both construction difficulty and cost of deploying the goods transport system 10.

Further, the interface assembly comprises the landing platform 110 and the interface facility 120, the landing platform 110 is used for landing of the unmanned aerial vehicle 40, the interface facility 120 is capable of engaging in the goods 30 transfers to/from the ground equipment 50, the transport assembly 400 is capable of being positioned at the transfer opening 112, in order to transfer the goods 30 to/from the unmanned aerial vehicle 40, and the transport assembly 400 is also capable of transferring the goods 30 to/from the interface facility 120, thus enabling the transport assembly 400 to deliver the goods 30 among the landing platform 110, the storage box 220 and the interface facility 120, thereby realizing and facilitating the goods 30 delivery among the user, the ground equipment 50 and the unmanned aerial vehicle 40. When the goods transport system 10 is applied to the multi-storey building, the landing platform 110 may be installed on top portion of the building 20, so as to ease landing of the unmanned aerial vehicle 40 and to keep the unmanned aerial vehicle 40 away from the user, the interface facility 120 may be arranged on bottom portion of the building 20 to interface with the ground equipment 50, thus realizing the goods 30 delivery among the user staying in the multi-storey building, the ground equipment 50 and the unmanned aerial vehicle 40, and enabling the user to access the goods 30 without the need to go downstairs, which is very convenient.

Furthermore, the storage box 220 is provided with the first access opening 222 and the second access opening 224, the second access opening 224 is used for the transport assembly 400 to reach into the storage box 220 so as to move the goods 30 into or out of the storage box 220, the first access opening 222 is used for the user to access the goods 30, thereby making the access opening for the user and the access opening for the transport assembly 400 separate, ensuring safety of the user.

A method for installing the goods transport system 10 according to an implementation, as one of methods for installing the goods transport system 10, comprising the following steps.

In step S61, installing the interface assembly on the building 20.

Specifically, the step of installing the interface assembly on the building 20 includes installing the landing platform 110 on top portion of the building 20, and installing the interface facility 120 on bottom portion of the building 20.

More specifically, in the step of installing the landing platform 110 on top portion of the building 20, the working surface 114 of the landing platform 110 for the unmanned aerial vehicle 40 to land on is horizontally arranged. in the step of installing the interface facility 120 on bottom portion of the building 20, the transport opening 122 of the interface facility 120 is configured to face upwards, and the interface opening 124 is configured to be positioned in one side of the interface facility 120 away from the building 20.

In step S62, installing the storage assembly 200 adjacent to the communicating portion 21 of the building 20, wherein the communicating portion 21 communicates with outside of the building 20, and arranging the first access opening 222 of the storage box 220 towards the building 20, enabling the storage box 220 to move until the storage box 220 is opposite the communicating portion 21 and the first access opening 222 is exposed.

Wherein the communicating portion 21 is the window or the balcony. If the communicating portion 21 is the window, the storage assembly 200 is arranged below the window; and if the communicating portion 21 is the balcony, the storage assembly 200 is arranged on exterior side of the balcony railing.

In the illustrated embodiment, the communicating portion 21 is the window. The bottom wall of the outer box body 210 is opposite to the first opening 212, and is configured to face downwards, while the first opening 212 is configured to face upwards. It should be understood that the storage assembly 200 is not limited to be installed in the above-mentioned way, in other embodiments, the first opening 212 of the outer box body 210 may be configured to face downwards and the bottom wall may be configured to face upwards, while the storage assembly 200 is installed above the communicating portion 21.

In step S63, installing the transport assembly 400 on the building 20.

Specifically, the step of installing the transport assembly 400 on the building 20 includes installing the sliding rail 410 extending in vertical direction on the building 20, making one end of the sliding rail 410 extend to the transfer opening 112 and making the other end of the sliding rail 410 extend to the interface facility 120, wherein the carrying mechanism 420 is installed on the sliding rail 410, and the carrying mechanism 420 comprises two clamping arms 424, which are oppositely arranged, at least one of the two clamping arms 424 is capable of sliding in the first direction, the two clamping arms 424 are also extendable in the second direction perpendicular to the first direction. The second access opening 224 of the storage box 220 is arranged towards the sliding rail 410, enabling the two clamping arms 424 to reach into the storage box 220 via the second access opening 224.

More specifically, one end of the sliding rail 410 is far away from the transfer opening 112, and extends to the transport opening 122 of the interface facility 120.

It should be understood that the above-mentioned method for installing the goods transport system 10 is not limited to following the above-mentioned sequence. The sequence of the steps S61, S62 and S63 may be changed freely, for example, the transport assembly 400 may be installed first, the interface assembly and the storage assembly 200 may be installed afterwards, and so on.

As the goods transport system 10 is installed by the above-mentioned method, not only is physical contact of the user and the unmanned aerial vehicle 40 avoided, ensuring safety of the user, but also the user does not need to go downstairs for receiving and sending the goods 30, making life easier.

A method for delivering the goods 30 according to an implementation, as one of methods for delivering the goods 30 based on the goods transport system 10, comprising the following steps.

In step S71, the unmanned aerial vehicle 40 lands on the landing platform 110, and offloads the goods 30 onto the transport assembly 400 positioned at the landing platform 110.

Specifically, the step that the unmanned aerial vehicle 40 offloads the goods 30 onto the transport assembly 400 positioned at the landing platform 110 is as follows: the two clamping arms 424 of the transport assembly 400 pass through the transfer opening 112, the unmanned aerial vehicle 40 places the goods 30 between the two clamping arms 424, the two clamping arms 424 slide in the first direction to make closer to each other, so as to clamp the goods 30, then the unmanned aerial vehicle 40 offloads the goods 30.

In step S72, the transport assembly 400 reaches into the storage box 220 via the second access opening 224, so as to move the goods 30 into the storage box 220, in order for the user to take the goods 30 via the first access opening 222, alternatively, the transport assembly 400 delivers the goods 30 to the interface facility 120, in order for the ground equipment 50 to take the goods 30 away. Thus, after the transport assembly 400 takes the goods 30 from the unmanned aerial vehicle 40, there are two ways for the transport assembly 400 to deliver the goods 30, one way is that the transport assembly 400 reaches into the storage box 220 via the second access opening 224 to move the goods 30 into the storage box 220, the other way is that the transport assembly 400 delivers the goods 30 to the interface facility 120.

Specifically, the step that the transport assembly 400 reaches into the storage box 220 via the second access opening 224 to move the goods 30 into the storage box 220 is as follows: the carrying mechanism 420 slides along the sliding rail 410 to approach the storage box 220, the two clamping arms 424 both extend and reach into the storage box 220 via the second access opening 224, so as to move the goods 30 into the storage box 220: the two clamping arms 424 slide to make farther from each other, thereby releasing the goods 30, then the two clamping arms 424 both retract to leave the storage box 220. In this way, after the step that the transport assembly 400 reaches into the storage box 220 via the second access opening 224 to move the goods 30 into the storage box 220, the storage box 220 moves out of the outer box body 210 via the first opening 212, to make the first access opening 222 opposite the communicating portion 21, the user takes the goods 30 out of the storage box 220 via the first access opening 222: subsequently, the storage box 220 moves back into the outer box body 210 to make the first access opening 222 blocked by the outer box body 210.

Specifically, the step that the transport assembly 400 delivers the goods 30 to the interface facility 120 is as follows: the transport assembly 400 slides along the sliding rail 410 until the transport assembly 400 reaches the transport opening 122 of the interface assembly, the two clamping arms 424 slide in the first direction to make farther from each other so as to release the goods 30, and the goods 30 enters the interface facility 120 through the through hole 422a and the transport opening 122. In this way, after the step that the transport assembly 400 delivers the goods 30 to the interface facility 120, there is a step of the goods 30 transfer between the interface facility 120 and the ground equipment 50 via the interface opening 124.

This method for delivering the goods 30 is based on the goods transport system 10, realizing that the goods 30 are automatically delivered from the unmanned aerial vehicle 40 to the storage box 220 in order for the user staying in the building 20 to take, and to the interface facility 120 in order for the ground equipment 50 to take away.

A method for delivering the goods 30 according to another implementation, as one of methods for delivering the goods 30 based on the goods transport system 10, comprising the following steps.

In step S81, the storage box 220 moves to make the first access opening 222 exposed, the user puts the goods 30 into the storage box 220, then the storage box 220 moves again to make the first access opening 222 blocked.

Specifically, step S81 is as follows: the storage box 220 moves out of the outer box body 210 via the first opening 212, to make the first access opening 222 opposite the communicating portion 21, the user puts the goods 30 into the storage box 220 via the first access opening 222: then the storage box 220 moves back into the outer box body 210, to make the first access opening 222 blocked by the outer box body 210.

In step S82, the transport assembly 400 reaches into the storage box 220 via the second access opening 224, and takes the goods 30 out.

Specifically, the step S82 is as follows: the carrying mechanism 420 slides along the sliding rail 410 to approach the storage box 220: the two clamping arms 424 both extend and reach into the storage box 220 via the second access opening 224: the two clamping arms 424 slide to make closer to each other so as to clamp the goods 30, then the two clamping arms 424 both retract to move the goods 30 away from the storage box 220.

Further, the step that the two clamping arms 424 slide to make closer to each other so as to clamp the goods 30 is as follows: the two clamping arms 424 slide to make closer to each other, until a distance between the positioning pieces 424*c* of the two clamping arms 424 is less than a width of the goods 30, the two clamping arms 424 both retract, the positioning pieces 424*c* push the goods 30 to the specified position, then the two clamping arms 424 extend again, and subsequently slide to make closer to each other so as to clamp the goods 30.

In step S83, the transport assembly 400 delivers the goods 30 to the interface facility 120, in order for the ground equipment 50 to take the goods 30 away, alternatively, the transport assembly 400 delivers the goods 30 to the transfer opening 112, in order for the unmanned aerial vehicle 40 to take the goods 30 away. Thus, after the transport assembly 400 takes the goods 30 from the storage box 220, there are two ways for the transport assembly 400 to deliver the goods 30, one way is that the transport assembly 400 delivers the goods 30 to the interface facility 120, the other way is that the transport assembly 400 delivers the goods 30 to the transfer opening 112, in order for the unmanned aerial vehicle 40 to take the goods 30 away.

Specifically, the step that the transport assembly 400 delivers the goods 30 to the interface facility 120 is as follows: the transport assembly 400 slides along the sliding rail 410 until the transport assembly 400 reaches the transport opening 122 of the interface assembly, the two clamping arms 424 slide in the first direction to make farther from each other so as to release the goods 30, and the goods 30 enters the interface facility 120 through the through hole 422*a* and the transport opening 122. In this way, after the step that the transport assembly 400 delivers the goods 30 to the interface facility 120, there is a step of the goods 30 transfer between the interface facility 120 and the ground equipment 50 via the interface opening 124.

Specifically, the step that the transport assembly 400 delivers the goods 30 to the transfer opening 112 in order for the unmanned aerial vehicle 40 to take the goods 30 away is as follows: the transport assembly 400 slides along the sliding rail 410 with the goods 30 until the two clamping arms 424 of the transport assembly 400 pass through the transfer opening 112. In this way, after the step that the transport assembly 400 delivers the goods 30 to the transfer opening 112, there is a step that the unmanned aerial vehicle 40 secures the goods 30, and the two clamping arms 424 slide in the first direction to make farther from each other so as to release the goods 30.

This method for delivering the goods 30 is based on the goods transport system 10, realizing that the goods 30 are automatically delivered from the user staying in the building 20 to the interface facility 120 and to the unmanned aerial vehicle 40.

A method for delivering the goods 30 according to another implementation, as one of methods for delivering the goods 30 based on the goods transport system 10, comprising the following steps.

In step S91, the ground equipment 50 transfers the goods 30 to the interface facility 120.

Specifically, the ground equipment 50 transfers the goods 30 to the interface facility 120 via the interface opening 124.

In step S92, the transport assembly 400 takes the goods 30 from the interface facility 120.

Specifically, the step that the transport assembly 400 takes the goods 30 from the interface facility 120 is as follows: the transport assembly 400 slides along the sliding rail 410 until the transport assembly 400 reaches the transport opening 122 of the interface assembly, the interface facility 120 moves the goods 30 through the transport opening 122 and the through hole 422*a* until the goods 30 are placed between the two clamping arms 424, then the two clamping arms 424 slide in the first direction to make closer to each other so as to clamp the goods 30.

In step S93, the transport assembly 400 reaches into the storage box 220 via the second access opening 224, so as to move the goods 30 into the storage box 220, in order for the user to take the goods 30 via the first access opening 222, alternatively, the transport assembly 400 delivers the goods 30 to the transfer opening 112, in order for the unmanned aerial vehicle 40 to take the goods 30 away. Thus, after the transport assembly 400 takes the goods 30 from the interface facility 120, there are two ways for the transport assembly 400 to deliver the goods 30, one way is that the transport assembly 400 reaches into the storage box 220 via the second access opening 224 to move the goods 30 into the storage box 220, the other way is that the transport assembly 400 delivers the goods 30 to the transfer opening 112, in order for the unmanned aerial vehicle 40 to take the goods 30 away.

Specifically, the step that the transport assembly 400 reaches into the storage box 220 via the second access opening 224 to move the goods 30 into the storage box 220 is as follows: the carrying mechanism 420 slides along the sliding rail 410 to approach the storage box 220, the two clamping arms 424 both extend and reach into the storage box 220 via the second access opening 224, so as to move the goods 30 into the storage box 220: the two clamping arms 424 slide to make farther from each other, thereby releasing the goods 30, then the two clamping arms 424 both retract to leave the storage box 220. In this way, after the step that the transport assembly 400 reaches into the storage box 220 via the second access opening 224 to move the goods 30 into the storage box 220, the storage box 220 moves out of the outer box body 210 via the first opening 212, to make the first access opening 222 opposite the communicating portion 21, the user takes the goods 30 out of the storage box 220 via the first access opening 222: subsequently, the storage box 220 moves back into the outer box body 210 to make the first access opening 222 blocked by the outer box body 210.

Specifically, the step that the transport assembly 400 delivers the goods 30 to the transfer opening 112 in order for the unmanned aerial vehicle 40 to take the goods 30 away is as follows: the transport assembly 400 slides along the sliding rail 410 with the goods 30 until the two clamping arms 424 of the transport assembly 400 pass through the transfer opening 112. In this way, after the step that the transport assembly 400 delivers the goods 30 to the transfer opening 112, there is a step that the unmanned aerial vehicle 40 secures the goods 30, and the two clamping arms 424 slide in the first direction to make farther from each other so as to release the goods 30.

This method for delivering the goods 30 is based on the goods transport system 10, realizing that the goods 30 are automatically delivered from the ground equipment 50 to the user staying in the building 20 and to the unmanned aerial vehicle 40.

The technical features of the above-mentioned embodiments can be combined. In order to simplify the description, not all possible combinations of the technical features of the above-mentioned embodiments have been provided. It can be appreciated that, as long as no contradiction is concluded from these combinations, all reasonable combinations of the features should be considered as the scope recorded in the description.

The present disclosure mainly presents several embodiments with their descriptions more specific and detailed than others, but they should not be construed as limiting the scope of the present disclosure. It should be noted that for persons skilled in the art, several modifications and improvements can be made without departing from the conception of the present disclosure, which shall all fall within the scope of the present disclosure. Therefore, the scope of the present disclosure shall be subject to the appended claims.

The invention claimed is:

1. A goods transport system, comprising:
an interface assembly used for a transfer of goods to or from an external equipment, or, a landing platform used for landing of an unmanned aerial vehicle;
a storage assembly comprising a storage box used for accommodating the goods, wherein the storage box is provided with a first access opening and a second access opening, and the storage box is movable to enable the first access opening to be exposed and to be blocked; and
a transport assembly capable of transporting the goods,
wherein the transport assembly is capable of reaching into the storage box via the second access opening, enabling the transport assembly to move the goods into the storage box and to move the goods out of the storage box; and
wherein the transport assembly is capable of engaging in goods transfer to the external equipment or the interface assembly at the interface assembly, or engaging in goods transfer from the external equipment or the interface assembly at the interface assembly, enabling the transport assembly to deliver the goods between the interface assembly and the storage box; or, the transport assembly is capable of engaging in goods transfer to or from the unmanned aerial vehicle at the landing platform, enabling the transport assembly to deliver the goods between the landing platform and the storage box.

2. The goods transport system of claim 1, wherein the interface assembly comprises the landing platform and an interface facility, the landing platform is used for landing of the unmanned aerial vehicle, the interface facility is used for goods transfer to or from a ground equipment, the transport assembly is capable of engaging in goods transfer to or from the unmanned aerial vehicle at the landing platform, and the transport assembly is also capable of engaging in goods transfer to or from the interface facility, enabling the transport assembly to deliver the goods among the landing platform, the storage box and the interface facility; and/or
wherein the external equipment comprises the unmanned aerial vehicle and/or the unmanned ground vehicle.

3. The goods transport system of claim 1, wherein the transport assembly comprises a sliding rail and a carrying mechanism capable of sliding along the sliding rail and carrying the goods, the second access opening is arranged towards the sliding rail; the carrying mechanism comprises two oppositely arranged clamping arms, at least one of the two clamping arms is capable of sliding in a first direction, so that a distance between the two clamping arms is adjustable to enable the two clamping arms to clamp and to release the goods, the two clamping arms are also extendable in a second direction perpendicular to the first direction, so that the two clamping arms are capable of reaching into the storage box via the second access opening.

4. The goods transport system of claim 3, wherein each clamping arm comprises a mounting plate and a clamping plate arranged on the mounting plate, the mounting plates of the two clamping arms are oppositely arranged, and at least one of the mounting plates of the two clamping arms is capable of sliding in the first direction, so that a distance between the clamping plates of the two clamping arms is adjustable to enable the clamping plates to clamp and to release the goods; the clamping plates are capable of sliding in the second direction, so that the clamping plates are capable of reaching into the storage box via the second access opening; and wherein
each clamping arm further comprises a positioning piece, the positioning piece is fixed on one side of the clamping plate of the clamping arm close to the other clamping arm, and is disposed at end portion of the clamping plate in the second direction, the positioning pieces are capable of pushing the goods located in the storage box to adjust a position of the goods; and/or, a supporting portion which extends perpendicularly from one side of the clamping plate is provided, the supporting portion is disposed on one side of the clamping plate of the clamping arm close to the other clamping arm, and the supporting portions of the two clamping arms are capable of jointly supporting the goods.

5. The goods transport system of claim 3, wherein the sliding rail is provided with an electrical interface capable of being electrically connected to the storage assembly with a cable, so that the sliding rail is capable of supplying electricity to the storage assembly and transmitting data to or from the storage assembly; and/or
wherein a protective structure is provided at one side of the sliding rail, the protective structure extends from one end of the sliding rail to the other end of the sliding rail; and wherein when the two clamping arms are retracted, the carrying mechanism is configured to be accommodated in the protective structure to protect the carrying mechanism and the carried goods from external environment influence.

6. The goods transport system of claim 1, wherein the storage assembly further comprises an outer box body, a first opening and a second opening are formed in the outer box body, and the storage box is capable of being accommodated in the outer box body, enabling the outer box body to block the first access opening, and the storage box is also capable of moving out via the first opening, enabling the first access opening to be exposed; and wherein when the storage box is accommodated in the outer box body, a position of the second access opening is configured to correspond to a position of the second opening, and the transport assembly is capable of reaching into the storage box via the second access opening and the second opening.

7. The goods transport system of claim 6, wherein the storage box is provided with a plurality of compartments, each compartment is provided with the first access opening and the second access opening, positions of a plurality of second access openings are all configured to correspond to the position of the second opening, and the storage box is capable of moving out via the first opening to make the first access opening of at least part of the compartments exposed.

8. The goods transport system of claim 1, wherein the interface assembly comprises the landing platform and an interface facility, the external equipment comprises the unmanned aerial vehicle and an unmanned ground vehicle, the landing platform is configured to be installed on top portion of a building and is used for landing of the unmanned aerial vehicle, the interface facility is configured to be installed on bottom portion of the building and is used for goods transfer to or from the ground equipment, the storage assembly is arranged between the landing platform and the interface facility; a transfer opening for the goods to pass through is formed in the landing platform, the transport assembly comprises a sliding rail and a carrying mechanism capable of sliding along the sliding rail and carrying the goods, one end of the sliding rail extends to the transfer opening, and the other end of the sliding rail extends to the interface facility, so that the carrying mechanism is capable of being positioned at the transfer opening to engage in goods transfer to or from the unmanned aerial vehicle, and the carrying mechanism is capable of being positioned at the interface facility; and wherein the storage box is arranged proximate the sliding rail, the carrying mechanism is also capable of reaching into the storage box via the second access opening, enabling the carrying mechanism to deliver the goods among the transfer opening, the storage box and the interface facility.

9. The goods transport system of claim 1, wherein the first access opening is used for a user to access the goods; and/or wherein when the first access opening is exposed, the first access opening is configured to be opposite a communicating portion of a building which communicates with outside of the building, thus facilitating the user to take the goods out of the storage box or to put the goods into the storage box; and/or wherein the storage assembly further comprises a shielding door capable of covering the second access opening; when the transport assembly and the storage assembly are in goods transfer state, the first access opening is configured to be blocked; and when the first access opening is exposed, the shielding door is configured to be in a closed state; and/or the second access opening enables the transport assembly to move the goods into the storage box, in order for the user to take the goods via the first access opening; and/or the first access opening enables the user to put the goods into the storage box, in order for the transport assembly to take the goods out via the second access opening.

10. The goods transport system of claim 1, wherein the storage assembly is configured to be arranged adjacent to a communicating portion of a building which communicates with outside of the building; and wherein the storage box is capable of moving until the first access opening is opposite the communicating portion of the building to make the first access opening exposed, or, the first access opening is configured to be opposite the communicating portion of the building when exposed; and/or wherein when the storage assembly is arranged adjacent to the communicating portion of the building, the first access opening is used for a user to access the goods, or, the first access opening is used for the user to put the goods into the storage box and/or to take the goods out of the storage box.

11. The goods transport system of claim 10, wherein the communicating portion of the building is a window or a balcony; and/or wherein the storage box is capable of moving up and down relative to the building; on condition that the communicating portion of the building is the window, the storage assembly is configured to be arranged on exterior wall of the building and below or above the window; on condition that the communicating portion of the building is the balcony, the storage assembly is configured to be arranged on exterior side of a balcony railing.

12. A method for installing a goods transport system, wherein the goods transport system comprises an interface assembly used for a transfer of goods to or from an external equipment, a storage assembly comprising a storage box used for accommodating the goods, and a transport assembly capable of delivering the goods between the interface assembly and the storage box; and wherein the storage box is provided with a first access opening used for a user to access the goods, the storage box is movable to enable the first access opening to be exposed and to be blocked; and wherein the method comprises:

installing the interface assembly on a building;

installing the storage assembly adjacent to a communicating portion of the building, and orienting the first access opening of the storage box towards the building with the first access opening not on the bottom side of the storage box, enabling the storage box to move until the storage box is opposite the communicating portion and the first access opening is exposed, wherein the communicating portion of the building communicates with outside of the building; and installing the transport assembly on the building.

13. The method of claim 12, wherein the communicating portion is a window or a balcony; and/or wherein the storage box is capable of moving up and down relative to the building, in order to make the first access opening opposite the communicating portion; the storage assembly is arranged on exterior wall of the building and below or above the window, or, the storage assembly is arranged on exterior side of a balcony railing; and/or wherein the transport assembly comprises a sliding rail and a carrying mechanism capable of sliding along the sliding rail and carrying the goods, the carrying mechanism comprises two oppositely arranged clamping arms, the storage box is further provided with a second access opening; the second access opening is arranged towards the sliding rail, enabling the two clamping arms to reach into the storage box via the second access opening.

14. A storage assembly, comprising a storage box used for accommodating goods, wherein the storage box is provided with a first access opening and a second access opening, and the storage box is movable to enable the first access opening to be exposed and to be blocked; and wherein the storage assembly is configured to be arranged adjacent to a communicating portion of a building, which communicates with outside of the building; and wherein when the storage assembly is arranged adjacent to the communicating portion of the building with the first access opening being used for a user to access the goods, and the second access opening being used for a transfer of the goods between the storage box and a transport assembly capable of transporting the goods, the first access opening is configured to be opposite the communicating portion of the building when exposed, or the storage box is capable of moving until the first access opening is opposite the communicating portion of the building to make the first access opening exposed.

15. The storage assembly of claim 14, further comprising a shielding door capable of covering the second access opening; wherein when the transport assembly and the storage assembly are in goods transfer state, the first access opening is configured to be blocked; and wherein when the first access opening is exposed, the shielding door is configured to be in a closed state; and/or wherein the second access opening is used for the transport assembly to reach into the storage box so as to move the goods into and/or out of the storage box, the first access opening is used for the user to put the goods into the storage box and/or to take the goods out of the storage box; and/or wherein the first access opening is arranged in a side of the storage box; when the storage assembly is arranged adjacent to the communicating portion of the building, the first access opening is configured to be oriented sideways; and/or the second access opening enables the transport assembly to move the goods into the storage box, in order for the user to take the goods via the first access opening; and/or the first access opening enables the user to put the goods into the storage box, in order for the transport assembly to take the goods out via the second access opening.

16. The storage assembly of claim 14, wherein the communicating portion is a window or a balcony; and/or wherein the storage box is capable of moving up and down relative to the building, in order to make the first access opening opposite the communicating portion; on condition that the communicating portion of the building is the window, the storage assembly is configured to be arranged on exterior wall of the building and below or above the window; on condition that the communicating portion of the building is the balcony, the storage assembly is configured to be arranged on exterior side of a balcony railing.

17. The storage assembly of claim 14, further comprising a range sensor arranged on the storage box, wherein the range sensor is capable of detecting an obstacle in order for movement control of the storage box, so as to prevent the storage box from colliding with the obstacle in a direction of movement; and/or wherein the storage assembly further comprises an alarm arranged on the storage box, the alarm is capable of giving an alarm while the storage box is moving; and/or wherein a weight sensor is provided at bottom of the storage box and is configured to weigh the goods in the storage box; after each time the user places the goods, a weight gain is measured by the weight sensor, in order to get a weight of the goods.

18. The storage assembly of claim 14, wherein the storage assembly further comprises an outer box body, a first opening and a second opening are formed in the outer box body, and the storage box is capable of being accommodated in the outer box body, enabling the outer box body to block the first access opening, and the storage box is also capable of moving out via the first opening, enabling the first access opening to be exposed; and wherein when the storage box is accommodated in the outer box body, a position of the second access opening is configured to correspond to a position of the second opening, enabling the transport assembly to reach into the storage box via the second access opening and the second opening.

19. The storage assembly of claim 18, wherein the storage box is provided with a plurality of compartments, each compartment is provided with the first access opening and the second access opening, positions of a plurality of second access openings are all configured to correspond to the position of the second opening, and the storage box is capable of moving out via the first opening to make the first access opening of at least part of the compartments exposed; and/or wherein the first opening and the second opening are respectively arranged in two adjacent faces of the outer box body; the outer box body is provided with a bottom wall opposite to the first opening: when the storage assembly is arranged adjacent to the communicating portion of the building, the bottom wall is configured to face downwards and the first opening is configured to face upwards, or, the first opening of is configured to face downwards and the bottom wall is configured to face upwards.

20. A method for delivering goods by a goods transport system, wherein the goods transport system comprises an interface assembly used for a transfer of goods to or from an external equipment, a storage assembly comprising a storage box used for accommodating the goods, and a transport assembly capable of transporting the goods; and wherein the storage box is provided with a first access opening and a second access opening, the storage box is movable to enable the first access opening to be exposed and to be blocked; and wherein the method comprises:

the interface assembly comprising a landing platform, the external equipment comprising an unmanned aerial vehicle; after the unmanned aerial vehicle lands on the landing platform and offloads the goods onto the transport assembly positioned at the landing platform, the transport assembly reaching into the storage box via the second access opening, so as to move the goods into the storage box, the storage box moving to make the first access opening opposite a communicating portion of a building which communicates with outside of the building, in order for a user to take the goods via the first access opening, or, the interface assembly further comprising an interface facility, the external equipment further comprising a ground equipment, the transport assembly comprising a sliding rail and a carrying mechanism capable of sliding along the sliding rail and carrying the goods, the carrying mechanism comprising two oppositely arranged clamping arms, after the unmanned aerial vehicle lands on the landing platform and offloads the goods onto the transport assembly positioned at the landing platform, the transport assembly delivering the goods to the interface facility, the two clamping arms sliding in a first direction to make farther from each other so as to release the goods, in order for the ground equipment to take the goods away; or the storage box moving to make the first access opening exposed, after the user puts the goods into the storage box, the storage box moving again to make the first access opening blocked, the transport assembly reaching into the storage box via the second access opening and taking the goods out; the interface assembly comprising the interface facility, the external equipment comprising the ground equipment, the transport assembly delivering the goods to the interface facility, in order for the ground equipment to take the goods away, or, the interface assembly comprising the landing platform, a transfer opening for the goods to pass through being formed in the landing platform, the external equipment comprising the unmanned aerial vehicle, the transport assembly delivering the goods to the transfer opening, in order for the unmanned aerial vehicle to take the goods away; or the interface assembly comprising the interface facility, the external equipment comprising the ground equipment; after the ground equipment transfers the goods to the interface facility, the transport assembly taking the goods from the interface facility; the transport assembly reaching into the storage box via the second access opening so as to move the goods into the storage box, the storage box moving to make the first access opening opposite the communicating portion of the building which communicates with outside of the building, in order for the user to take the goods via the first access opening, or, the interface assembly further comprising the landing platform, the transfer opening for the goods to pass through being formed in the landing platform, the external equipment further comprising the unmanned aerial vehicle, the transport assembly comprising the sliding rail and the carrying mechanism capable of sliding along the sliding rail and carrying the goods, the carrying mechanism comprising two oppositely arranged clamping arms, the transport assembly delivering the goods to the transfer opening, the two clamping arms sliding in the first direction to make farther from each other so as to release the goods, in order for the unmanned aerial vehicle to take the goods away.

\* \* \* \* \*